United States Patent [19]

Eck et al.

[11] Patent Number: 4,874,638

[45] Date of Patent: Oct. 17, 1989

[54] PROCESS FOR IMPROVING THE ADHESION OF POLYMERIC SUBSTANCES

[75] Inventors: Herbert Eck, Burghausen; Gerald Fleischmann, Emmerting; Alfred Prasse, Burghausen; Kunigunde Kolbig, Gumpersdorf-Postann, all of Fed. Rep. of Germany

[73] Assignee: Wacker-Chemie GmbH, Munich, Fed. Rep. of Germany

[21] Appl. No.: 171,050

[22] Filed: Mar. 21, 1988

[30] Foreign Application Priority Data

Apr. 3, 1987 [DE] Fed. Rep. of Germany ....... 3711225

[51] Int. Cl.$^4$ ............................. B05D 3/02; B05D 3/10
[52] U.S. Cl. .................................... 427/222; 427/302; 427/387; 427/407.1; 427/444
[58] Field of Search ..................... 427/302, 387, 407.1, 427/222, 444

[56] References Cited

U.S. PATENT DOCUMENTS 3,859,320  1/1975  Atherton .............................. 427/387
4,120,995 10/1978  Phipps .................................. 427/382

FOREIGN PATENT DOCUMENTS 6100675  8/1981  Japan ................................... 427/302
6100676  8/1981  Japan ................................... 427/302

Primary Examiner—Janyce Bell

[57] ABSTRACT

A process for improving the adhesion of polymeric substances containing organic groups or composed of such groups to the surfaces of alkaline earth metal carbonates, which comprises applying an organic aprotic solvent solution containing at least one organosilicon compound having fluorine bonded directly to silicon and an average of not more than 1.8 SiC-bonded organic radicals per silicon atom to the surface of alkaline earth metal carbonates and removing the solvent before a polymeric substance containing organic groups is applied to the pretreated alkaline earth metal carbonate surface.

8 Claims, No Drawings

PROCESS FOR IMPROVING THE ADHESION OF POLYMERIC SUBSTANCES

The present invention relates to the adhesion of polymeric substances and more particularly to a process for improving the adhesion of polymeric substances to alkaline earth metal carbonates.

BACKGROUND OF THE INVENTION

Often improved adhesion of polymeric materials to alkaline earth metal carbonates is necessary or desired, especially when the alkaline earth metal carbonate surfaces are coated with polymeric substances which are in contact with sulfur dioxide.

It is, therefore, an object of the present invention to improve the adhesion of polymeric substances to alkaline earth metal substrates. Another object of the present invention is to promote adhesion of polymeric substances containing organic groups to surfaces of alkaline earth metal carbonates. Still another object of the present invention is to promote the adhesion of polymeric substances to surfaces of alkaline earth metal carbonates with substances having a low toxicity. A further object of the present invention is to provide a process for improving the adhesion of polymeric substances to alkaline earth metal carbonates which are in contact with sulfur dioxide.

SUMMARY OF THE INVENTION

The foregoing objects and others which will become apparent from the following description are accomplished in accordance with this invention, generally speaking, by providing a process for improving the adhesion of polymeric substances to alkaline earth metal carbonates which comprises applying to the alkaline earth metal carbonate surface, an organic aprotic solvent solution containing at least one organosilicon compound having fluorine bonded directly to silicon and an average of not more than 1.8 SiC-bonded organic solvent radicals per silicon atom, and then removing the solvent before contacting the treated alkaline earth metal carbonate surface with a polymeric substance containing organic groups.

DESCRIPTION OF THE INVENTION

The alkaline earth metal carbonate surfaces to which the adhesion of polymeric substances containing organic groups or composed of such groups is increased are surfaces of magnesium carbonate, calcium carbonate, barium carbonate, mixtures of at least two carbonates of this type and also, for example, rocks containing alkaline earth metal carbonates, such as natural or artificial calcareous sandstones, nagelfluh or swelling tufas, concrete or lime mortar or plasters. These alkaline earth metal carbonate surfaces can be porous and rough, like those of calcareous sandstones, or virtually free from pores and smooth, like those of polished marble. The alkaline earth metal carbonate surfaces can be those of powders or dusts, such as are present, for example, in the case of fillers, for example, ground chalk, or other calcium carbonates suitable for use as fillers, for example, finely divided acicular calcium carbonate, or can be those of larger structures, such as blocks, panels or facades.

The organosilicon compounds used in accordance with this invention, having fluorine bonded directly to silicon and an average of not more than 1.8 SiC-bonded organic radicals per silicon atom, preferably are those of the formula $$R_a SiF_b (OR^1)_{4-a-b}$$

where R represents the same or different monovalent hydrocarbon radicals and substituted monovalent hydrocarbon radicals, $R^1$ represents the same or different alkyl or alkoxyalkylene radicals having from 1 to 4 carbon atoms per radical, a is 0, 1, 2 or 3, preferably an average of from 0.9 to 1.8, b is 1, 2, 3 or 4, and the sum of a+b is not greater than 4, or partial hydrolysates thereof containing not more than 15 silicon atoms per molecule.

If only one type of such silane is used, a must have a value of 1.

The organosilicon compounds used in accordance with this invention having fluorine bonded directly to silicon and an average of not more than 1.8 SiC-bonded organic radicals per silicon atom can, however, also be, for example, silcarbanes having fluorine bonded directly to silicon, such as those of the formula $$F_3Si(CH_2)_2SiF_3,$$

or organopolysiloxanes having at least 16 silicon atoms per molecule and containing units of the formula $$R_a F_c Si(OR^1)_d (OH)_e O_{\frac{4-a-c-d-e}{2}}$$

in which R, $R^1$ and a are each the same as above, c is 1, 2 or 3, preferably an average of from 0.1 to 1.8, d is 0, 1, 2 or 3, preferably an average of from 0.0 to 2.0, and e is 0, 1 or 2, with an average of from 0.0 to 0.5, and with the proviso that the sum of a+c+d+e in each unit is not greater than 3.5.

In addition to an organosilicon compound having fluorine bonded directly to silicon and an average of not more than 1.8 SiC-bonded organic radicals per silicon atom, the solutions used in accordance with this invention can advantageously contain at least one other organic silicon compound which is free of fluorine bonded directly to silicon. Examples of such further silicon compounds are, in particular, those of the formula $$R_f Si(OR^1)_{4-f}$$

in which R and $R^1$ are each the same as above and f is 0, 1, 2 or 3, preferably an average of from 0.0 to 1.8, partial hydrolysates thereof containing not more than 15 silicon atoms per molecule, silcarbanes which are free of fluorine bonded directly to silicon, such as those of the formula $$(C_2H_5O)_3Si(CH_2)_2Si(OC_2H_5)_3,$$

and organopolysiloxanes having units of the formula $$R_a H_g Si(OR^1)_d (OH)_e O_{\frac{4-a-d-e-g}{2}}$$

where R, $R^1$, a, d and e are each the same as above and g is 0 or 1, preferably an average of from 0 to 1, with the proviso that the sum of a+d+e+g in each unit is not greater than 3.5.

The solutions used in accordance with this invention, which are applied to the alkaline earth metal carbonate surfaces prior to the application of the polymeric material, preferably have from 0.5 to 300 fluorine atoms bonded directly to silicon per 100 silicon atoms.

The SiC-bonded organic radicals in the organosilicon compounds used in accordance with this invention, and hence the radicals represented by R in the above formulas, preferably contain not more than about 18 carbon atoms per radical. Examples of SiC-bonded organic radicals, i.e., hydrocarbon radicals, represented by R in the above formulas, are alkyl radicals, such as the methyl, ethyl, n-propyl, isopropyl, hexyl, 2-ethylhexyl and octadecyl radicals; hydrocarbon radicals having at least one aliphatic double bond, such as the vinyl, allyl, ethylallyl and butadienyl radicals; cycloalkyl radicals, such as the cyclohexyl and methylcyclohexyl radicals; aryl radicals, such as the phenyl radical; alkaryl radicals, such as the tolyl radicals; and aralkyl radicals, such as the benzyl radical.

Examples of substituted SiC-bonded organic radicals in the organosilicon compounds used in accordance with the invention, and hence of substituted hydrocarbon radicals represented by R in the above formulas, are halogenated hydrocarbon radicals, such as alkyl radicals substituted by fluorine atoms, for example, the 3,3,3-trifluoropropyl radical, and also chlorophenyl radicals; mercaptoalkyl radicals, such as the 3-mercaptopropyl radical, acyloxyalkyl radicals, such as the 3-methacryloxypropyl radical, radicals of the formulas

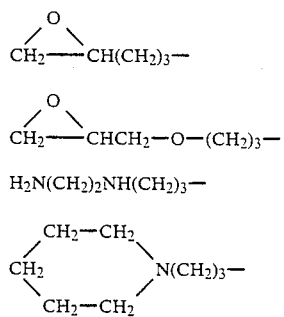

and cyanoalkyl radicals, such as the β-cyanoethyl radical.

Examples of alkyl radicals represented by $R^1$ are the methyl, ethyl, n-propyl, isopropyl, n-butyl and sec-butyl radicals. The most important example of an alkoxyalkylene radical represented by $R^1$ is the β-methoxyethylene radical.

Phenyltrifluorosilane is particularly preferred as an organosilicon compound having fluorine bonded directly to silicon and not more than 1.8 SiC-bonded organic radicals per silicon atom. Additional examples of silanes having fluorine bonded directly to silicon and not more than 1.8 SiC-bonded organic radicals are methyltrifluorosilane, methyldiethoxyfluorosilane, methylphenyldifluorosilane and 3-methacryloxypropyltrifluorosilane and also mixtures of at least two of these silanes.

The solutions which are applied to the alkaline earth metal carbonate surfaces prior to the application of the polymeric substance, may in addition to the silicon compounds having fluorine bonded directly to silicon and an average of not more than 1.8 SiC-bonded radicals per silicon atom, contain organosilicon compounds which are free of fluorine bonded directly to silicon.

Examples of such preferred organosilicon compounds are methyltrimethoxysilane, phenyltriethoxysilane, tetraethoxysilane and 3-methacryloxypropyltrimethoxysilane.

Preferred organic, aprotic solvents which may be employed are polar organic, aprotic solvents. Examples of suitable polar solvents are acetic acid esters of alkanols having from 1 to 4 carbon atoms per alkanol molecule, preferably ethanol. Additional examples of polar, organic, aprotic solvents which can be used are chlorinated hydrocarbons, such as methylene chloride, 1,2-dichloroethane, 1,1,1-trichloroethane, 1,2-dichloroethylene, 1,1,2-trichloroethylene, perchloroethylene and chlorobenzene; ketones, such as methyl ethyl ketone and cyclohexanone; and ethers, such as di-sec-butyl ether.

It is possible to use only one type of organic solvent; however, mixtures of two or more different types of such solvents may be used.

The solutions used in accordance with this invention generally have from 0.03 to 18, preferably from 0.3 to 10 and more preferably from 1.0 to 3.5 gram atoms of fluorine bonded directly to silicon per 100 g of their total weight.

The alkaline earth metal carbonate surfaces are preferably free from oily substances and other impurities, such as dust, before the application of the solutions used in accordance with this invention. Before the solutions of this invention are applied, the alkaline earth metal carbonate surfaces can be dry or moist because water or a solvent is adsorbed on them. Preferably, they are somewhat moist because water is adsorbed on them.

The application of the solutions used in accordance with this invention to the alkaline earth metal carbonate surfaces to be treated therewith can be carried out in any manner suitable for the application of aprotic, organic solvent solutions to normally solid surfaces; for example, by spraying, coating, brushing, rolling or dipping or by mixing with alkaline earth metal carbonate powder or dust.

The removal of the solvent from alkaline earth metal carbonate surfaces treated with the solutions used in accordance with this invention, before the surface is brought into contact with a polymeric substance, can be effected by allowing the solvent to evaporate or by volatilizing the solvent.

The polymeric substances which are applied to alkaline earth metal carbonate surfaces which have been treated with the solutions of this invention and after the solvent has been removed from the surfaces, can be any polymeric substances which contain organic groups or are composed of such groups. Even polymeric substances which have been applied heretofore to coat or impregnate alkaline earth metal carbonate surfaces may be used in this invention. Also, it is possible to form the polymeric substances after they have been applied to the pretreated alkaline earth metal carbonate surfaces from low-molecular weight substances, such as methyltriethoxysilane, or in which it has been possible for alkaline earth metal carbonates to be present as fillers or reinforcing agents.

Preferred examples of polymeric substances which contain organic groups or are composed of such groups which may be applied to alkaline earth metal carbonate surfaces after the surfaces have been pretreated with the solutions of this invention and after the solvent has been removed from the surfaces, are substances which contain, at least in part, units derived from alkyl esters or amides of acrylic acid or methacrylic acid, and, if appropriate, units derived from acryloxyalkylsilanes, particularly gamma-acryloxypropylsilanes, and/or methacryloxyalkylsilanes, especially 3-methacryloxypropylsilanes, such as 3-methacryloxypropyltrimethoxysilane.

Additional examples of polymeric substances which are composed of organic groups which may be applied to alkaline earth metal carbonate surfaces that have been pretreated with the solutions of this invention and the solvent removed from the surfaces, are polyvinyl chloride, polyvinylacetate, polyethylene and copolymers of the polymers mentioned above, elastomers of natural origin, organic, synthetic elastomers, such as EPDM or polybutadiene, epoxide resins, polyurethanes, polyesters, polyamides and polyureas.

Examples of polymeric substances which contain organic groups which may be applied to alkaline earth metal carbonate surfaces which have been pretreated with the solutions of this invention, and the solvent removed from the surfaces, are low-molecular weight substances which form polymers on the surfaces, such as, organoalkoxysilanes, for example, methyltriethoxysilane and phenyltriethoxysilane, or partial hydrolyzates thereof or thermoplastic or thermosetting organopolysiloxanes, such as organopolysiloxane elastomers.

A layer of polymeric substance can be applied to the alkaline earth metal carbonate surfaces which have been pretreated in accordance with this invention, or can be produced on these surfaces. It is also possible, however, to apply to the alkaline earth metal carbonate surfaces pretreated in accordance with this invention, at least two layers of the same or different polymeric substances, or to produce at least two layers of the same or different polymeric substances on these surfaces.

The polymeric substances which are composed of organic groups or contain such groups can be applied on the surfaces, after the solvent has been removed from the alkaline earth metal carbonate surfaces pretreated with a solution used in accordance with this invention, in any desired manner in which it has been possible, heretofore, to apply polymeric substances of this type onto surfaces. Fillers, for example, composed of, or containing an alkali metal carbonate, which have been pretreated in accordance with this invention may be mixed with the polymeric substances, or the polymeric substances may be applied to the surfaces to be coated, for example, by brushing, spraying, coating, rolling or dipping. In this regard, the polymeric substances can be used in an undiluted form, insofar as their viscosity permits, or in the form of solutions or dispersions.

In the following examples, all percentages are by weight unless otherwise specified.

EXAMPLES 1 TO 5

In each of the examples listed in Table I, 1 g of solution containing:
10 percent phenyltrifluorosilane, 40 percent of methyltrimethoxysilane and 50 percent of ethyl acetate (Example 1)
10 percent of phenyltrifluorosilane, 10 percent of 3-methacryloxypropyltrimethoxysilane and 80 percent of ethyl acetate (Example 2);
5 percent of phenyltrifluorosilane, 40 percent of methyltrimethoxysilane and 55 percent of ethyl acetate (Examples 3 and 4); and
10 percent of phenyltrifluorosilane, 10 percent of tetraethoxysilane, 15 percent of phenyl triethoxysilane, 15 percent of methyltrimethoxysilane and 50 percent of ethyl acetate (Example 5)

is applied in each case to moist surfaces 100 cm² in area of polished marble panels of the origin indicated in Table I, which had previously been rinsed with distilled water and had been allowed to stand for one hour at room temperature. The panels are then allowed to stand for 4 hours at room temperature in order to remove the solvent by evaporation. A coating based on a copolymer of methyl methacrylate and ethyl methacrylate (commercially available as "Paraloid B72", the name "Paraloid" being a registered trademark of the Rohm and Haas Company, Philadelphia, Pa., USA) is then applied to the pretreated alkaline earth metal carbonate surfaces. The strength of adhesion of the coating to the calcium carbonate surface is assessed by the cross-cut test specified in DIN [Deutsche Industrie Norm ("German Industrial Standard")] 53,151 of May 1981. In this test, the strength of adhesion of the coating is highest for a cross-cut value of 0. The higher the cross-cut value, the weaker the adhesion of the coating to the substrate.

TABLE I

| Example | Type of Marble | Cross-cut value Gt | | |
| --- | --- | --- | --- | --- |
| | | (1) | (2) | (3) |
| 1 | Jura | 2 | 0-1 | 0-1 |
| 2 | Jura | 0 | 1 | 1 |
| 3 | Jura | 0 | 1 | (++) |
| (4)a | Jura | 2-3 | 3 | (+++) |
| 4 | Botticino | 0 | 0-1 | (++) |
| 5 | Botticino | 0-1 | 1 | (+) |
| (4)b | Botticino | 1-2 | 1-2 | (+++) |

(1)After being stored for 16 hours at room temperature in air.
(2)After being stored for 16 hours at room temperature in air saturated with water and containing 20 g of sulfur dioxide per 50 liters at 20° C. and 1000 hPa (absolute).
(3)After being stored for 16 hours under water containing 6 percent sulfur dioxide.
(4)a and (4)b Comparison Examples: No pretreatment of the marble.
(+)The coating is partly detached from the substrate without the marble being attacked.
(++)Marble is slightly attacked.
(+++)Marble surface seriously corroded.

EXAMPLES 6 TO 11

In each of the examples listed in Table II below, 1 g of a solution containing:
10 percent of phenyltrifluorosilane, 10 percent of 3-methacryloxypropyltrimethoxysilane and 80 percent of ethyl acetate (Example 6);
5 percent of phenyltrifluorosilane, 40 percent of methyltrimethoxysilane and 55 percent of ethyl acetate (Examples 7 and 11);
10 percent of phenyltrifluorosilane, 40 percent of methyltrimethoxysilane and 50 percent of ethyl acetate (Example 8);
5 percent of phenyltrifluorosilane, 5 percent of methyltrimethoxysilane and 90 percent of ethyl acetate (Example 9); and
5 percent of phenyltrifluorosilane, 5 percent of tetraethoxysilane and 90 percent of ethyl acetate (Example 10)

is applied in each case to moist surfaces 100 cm² in area of polished marble panels of the origin indicated in Table II which had previously been rinsed with distilled water and had been allowed to stand for one hour at room temperature. The panels are then allowed to stand for 4 hours at room temperature in order to remove the solvent by evaporation. A commercially available lacquer based on a copolymer formed from 86 percent methyl methacrylate, 12 percent 2-hydroxyethyl acrylate and 2 percent 3-methacryloxypropyltrimethoxysilane is then applied to the pretreated alkaline earth metal carbonate surfaces. The strength of the adhesion of the coating to the calcium carbonate surface is determined in accordance with the procedure described in Example 1.

TABLE II

| Example | Type of Marble | Cross-cut value Gt | | |
|---|---|---|---|---|
| | | (1) | (2) | (3) |
| 6 | Jura | 0 | 2 | (+) |
| 7 | Jura | 1 | 1 | 2 |
| 8 | Jura | 2 | 0–1 | 0–1 |
| 9 | Jura | 0 | 0–1 | 4 |
| 10 | Jura | 0 | 0–1 | (+) |
| 11 | Botticino | 1 | 1 | 3 |
| (4)c | Botticino | 1–2 | 2 | (+++) |

(1)–(3)Same as in Table I.
(4)c Comparison Example: No pretreatment of the marble.
(+)–(+++)Same as in Table I.

EXAMPLE 12

The procedure of Example 1 is repeated, except that prior to the application of the commercially available coating based on a copolymer of methyl methacrylate and ethyl methacrylate, a mixture containing 99 percent of phenyltriethoxysilane and 1 percent of di-n-butyltin dilaurate (a hydrolysis and condensation catalyst) was applied to the marble surface which had been pretreated with a solution containing 10 percent of phenyltrifluorosilane, 40 percent of methyltrimethoxysilane and 50 percent of ethyl acetate and the solvent evaporated off.

EXAMPLE 13

The procedure described in Example 12 is repeated, except that 20 percent of phenyltriethoxysilane and 20 percent of methyltrimethoxysilane is substituted for the 40 percent of methyltrimethoxysilane.

TABLE III

| Example | Cross-cut Value Gt | | |
|---|---|---|---|
| | (1) | (2) | (3) |
| 12 | 2 | 0–1 | 0–1 |
| 13 | 0–1 | 0 | 0 |

(1)–(3)Same as in Table I.

What is claimed is:

1. A process for improving the adhesion of polymeric substances containing organic groups or composed of such groups to the surfaces of alkaline earth metal carbonates, which comprises applying to the alkaline earth metal carbonate surface an organic aprotic solvent solution containing at least one organosilicon compound having fluorine bonded directly to silicon and an average of not more than 1.8 SiC-bonded organic radicals per silicon atom, in which an organic group of the silicone compound is selected from the group consisting of hydrocarbon radicals having from 1 to 18 carbon atoms, halogen substituted hydrocarbon radicals, mercaptoalkyl radicals, acyloxyalkyl radicals, radicals of the formula

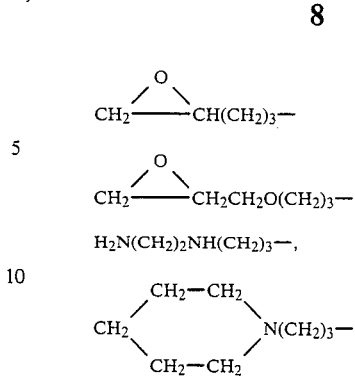

$H_2N(CH_2)_2NH(CH_2)_3-$,

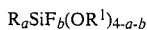

and cyanoalkyl radicals, and then removing the solvent before applying a polymeric substance containing organic groups to the alkaline earth metal carbonate surface.

2. The process of claim 1, wherein the alkaline earth metal carbonate surface is a marble surface.

3. The process of claim 1, wherein the organosilicon compound used is phenyltrifluorosilane having fluorine bonded directly to silicon.

4. The process of claim 2, wherein the organosilicon compound used is phenyltrifluorosilane having fluorine bonded directly to silicon.

5. The process as claimed in claims 1, 2, 3 or 4, wherein the solution containing at least one organosilicon compound having fluorine bonded directly to silicon also contains at least one additional organosilicon compound which is free of fluorine bonded directly to silicon.

6. The process of claim 1, wherein the organosilicon compound is selected from the group consisting of a silane of the formula $$R_aSiF_b(OR^1)_{4-a-b}$$

and partial hydrolyzates thereof having not more than 15 silicon atoms per molecule, where R is selected from the group consisting of monovalent hydrocarbon radicals having from 1 to 18 carbon atoms, halogen-substituted hydrocarbon radicals, mercaptoalkyl radicals, acyloxyalkyl radicals, radicals of the formula

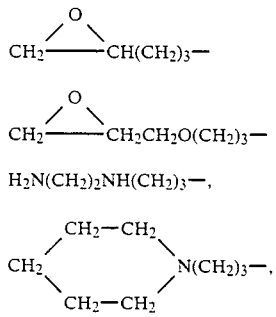

$H_2N(CH_2)_2NH(CH_2)_3-$,

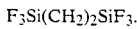

and cyanoalkyl radicals, $R^1$ is selected from the group consisting of alkyl and alkoxyalkylene radicals, a is 0, 1, 2 or 3, b is 1, 2, 3 or 4 and the sum of a+b does not exceed 4.

7. The process of claim 1, wherein the organosilicon compound is a silcarbane of the formula $$F_3Si(CH_2)_2SiF_3.$$

8. The process of claim 1, wherein the organosilicon compound is an organopolysiloxane having at least 16 silicon atoms per molecule and has units of the formula $$R_a F_c Si(OR^1)_d(OH)_e O_{\frac{4-a-c-d-e}{2}}$$

where R is selected from the group consisting of monovalent hydrocarbon radicals having from 1 to 18 carbon atoms, halogen-substituted hydrocarbon radicals, mercaptoalkyl radicals, acyloxyalkyl radicals, radicals of the formula

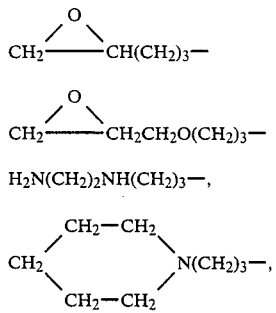

and cyanoalkyl radicals, $R^1$ is selected from the group consisting of alkyl and alkoxyalkylene radicals, a is 0, 1, 2 or 3; c is 1, 2 or 3; d is 0, 1, 2 or 3; and e is 0, 1 or 2, with the proviso that the sum of $a+c+d+e$ in each unit does not exceed 3.5.

* * * * *